United States Patent [19]
Gifford

[11] 3,771,556
[45] Nov. 13, 1973

[54] ONE WAY CHECK VALVE

[75] Inventor: Robert T. Gifford, Yellow Springs, Ohio

[73] Assignee: Vernay Laboratories, Inc., Yellow Springs, Ohio

[22] Filed: Dec. 27, 1971

[21] Appl. No.: 212,410

[52] U.S. Cl............................. 137/533.11, 74/587
[51] Int. Cl............................................ F16k 15/04
[58] Field of Search.................... 137/533.11, 519.5, 137/539

[56] References Cited
UNITED STATES PATENTS

| | | | |
|---|---|---|---|
| 3,062,416 | 11/1962 | Cooprider........................ | 137/539 X |
| 2,309,839 | 2/1943 | Gardner.......................... | 137/519.5 X |
| 2,855,127 | 10/1958 | Lerner et al................ | 137/533.11 X |
| 2,999,499 | 9/1961 | Willet............................. | 137/539 X |

FOREIGN PATENTS OR APPLICATIONS

| | | | |
|---|---|---|---|
| 1,416,352 | 9/1965 | France............................ | 137/533.11 |
| 1,301,426 | 7/1962 | France............................ | 137/519.5 |

Primary Examiner—Robert G. Nilson
Attorney—Lawrence B. Biebel et al.

[57] ABSTRACT

A one way check valve in which the valve cage is formed from a single piece of elastic material and a relatively rigid ball valve is installed in the valve cage by distorting the cage and forcing the ball through the inlet opening into the cage. The outlet of the valve is divided into a series of outlet passages by intersecting, tapered web members which positively prevent the loss of the ball valve from the interior of the valve cage and at the same time maintain the ball valve centrally of the valve body for rapid seating of the ball under reverse flow conditions.

10 Claims, 8 Drawing Figures

Patented Nov. 13, 1973
3,771,556
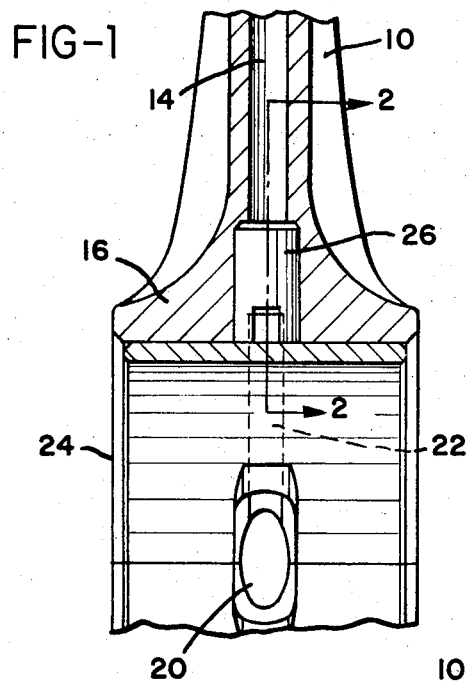
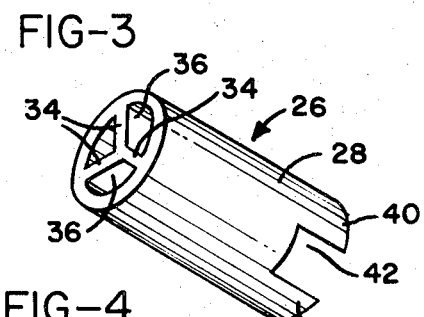
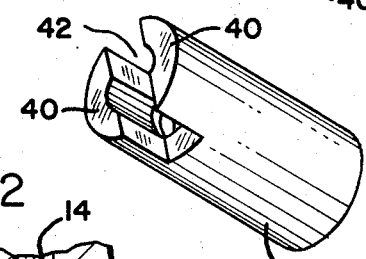
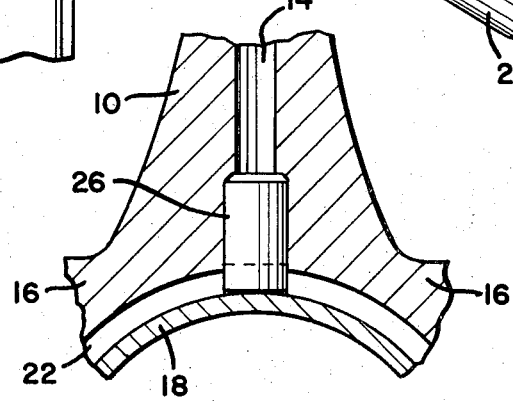
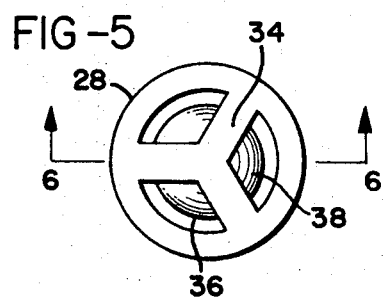
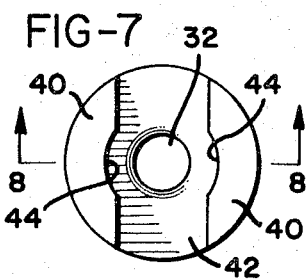
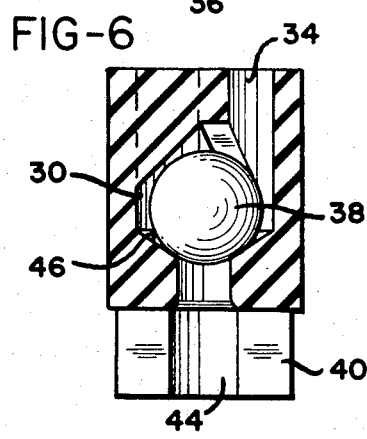
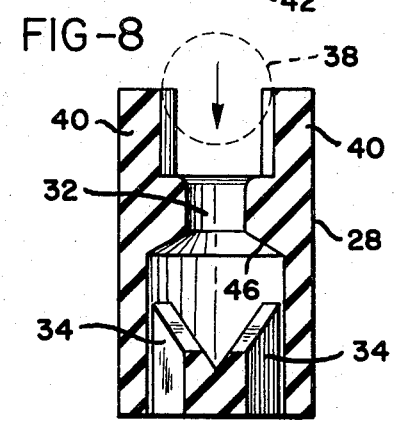

ONE WAY CHECK VALVE

BACKGROUND OF THE INVENTION

In the operation of relatively high speed engines, such as diesel engines, it is desirable to provide a supply of cooling oil to the piston dome. One manner in which this may be is done to provide an oil flow passage through the center of the piston connecting rod so that lubricating oil may be drawn upwardly through the passageway in the rod to the piston dome.

This upward flow of cooling oil is enhanced by the use of a one way check valve adjacent the entrance to the flow passage. Preferably, a valve so used will be of relatively simple construction to reduce manufacturing costs. Additionally, the valve must be relatively rugged, since it must act rapidly under severe operating conditons.

For example, normal engine speeds may be 2,100 rpm and greater, resulting in negative and positive vertical acceleration in excess of $-114,000$ in/sec$^2$ and $127,000$ in/sec$^2$, respectively, and a lateral acceleration in excess of $93,000$ in/sec$^2$. Additionally, it will be apparent that the life of the valve must be relatively great despite operating temperatures which may vary between $-50°F$ and $+232°F$.

While one piece check valves have been the subject of previous design efforts, as indicated by U.S. Pat. Nos. 2,855,127 and 3,096,825, valves of the type disclosed in the above noted patents are obviously not intended for use under the severe operating conditions described above.

SUMMARY OF THE INVENTION

The present invention provides a simplified valve assembly of rugged construction consisting of a one piece valve cage formed of a relatively elastic material and a rigid ball valve receivable in an axially extending flow port through the valve cage. The outlet from the flow port is divided into a plurality of outlet passages by inwardly projecting, tapered webs, which positively prevent the dislodgment of the ball valve from the interior of the valve cage and at the same time serve to maintain the ball valve properly positioned with respect to the valve seat.

The inlet to the interior of the valve cage is substantially smaller than the diameter of the ball valve and the elastic nature of the valve cage allows the cage to be distorted so that the ball valve can be forced into the interior of the valve through the inlet. Thus, the valve assembly of the present invention can be readily mass produced by forming the valve cage from a single piece of material and then installing the ball valve within the cage by distorting the cage to allow the ball to be forced through the inlet of the cage into the interior thereof. At the same time, the valve assembly of the present invention provides the rugged construction needed under operating conditions of the type described above.

BRIEF DESCRIPTION OF THE DRAWINGS

FIG. 1 is an elevational view, partly in section, showing the valve assembly of the present invention in a typical environment;

FIG. 2 is a view taken on line 2—2 of FIG. 1;

FIG. 3 is a perspective view of a valve assembly of the present invention;

FIG. 4 is a second perspective view of the valve assembly;

FIG. 5 is an end view of the valve assembly;

FIG. 6 is a view taken on line 6—6 of FIG. 5;

FIG. 7 is another end view taken from the opposite direction to that shown in FIG. 5; and FIG. 8 is a view taken on line 8—8 of FIG. 7.

DESCRIPTION OF THE PREFERRED EMBODIMENT

As seen in FIG. 1 of the drawings, the valve assembly of the present invention may find use in a connecting rod of a diesel engine or the like. Thus, a connecting rod 10 will be provided with a passageway 14 extending longitudinally thereof from adjacent its lower end 16 to its connection at its upper end (not shown) to a conventional piston. The lower end of the connecting rod 10 is provided with a sleeve 18 having an opening 20 therethrough communicating with a groove 22 formed in an upper portion of the collar 24 with the groove communicating with the lower end of the passageway 14. The lower end of the passageway 14 is enlarged, as shown in FIGS. 1 and 2, and receives the valve assembly 26 of the present invention.

Valve assembly 26 includes a one piece valve cage 28 formed of an elastic material, preferably having a durometer rating on the Shore A scale of approximately 50–90. A flow port 30 extends longitudinally of the valve cage and communicates with an inlet 32 adjacent one end of the valve cage. A plurality of ribs 34, three being shown, extend across the opposite end of the valve cage and divide it into a plurality of outlet passages 36.

A ball valve 38, formed of a relatively rigid material, such as nylon, is received in the flow port 30 and has a diameter in relationship thereto such that it is freely movable within the flow port. The diameter of the ball valve 38, however, is substantially greater than both the dimensions of the outlet passages 36 and the diameter of the inlet 32. It will also be noted, particularly from FIG. 6 of the drawings, that the ball valve 38 has a substantially greater diameter than the length of the flow port 30, the diameter of ball 38 being shown as having a diameter greater than twice the length of the flow port 30.

Adjacent the inlet 32 the valve cage is provided with a pair of spaced legs 40 which extend outwardly thereof and define a groove 42 which, in the installation shown in FIGS. 1 and 2 of the drawings, is aligned with the groove 22. Where the spaced legs 40 are provided they may be relieved slightly, as at 44, to assist in installing the ball valve 38 within the cage.

Thus, as seen in FIG. 8 of the drawings, the ball valve, shown in dotted lines, is received between the legs 40 and positioned with respect to the inlet 32 by means of the relieved portions 44. Thereafter, a force applied to the ball valve 38 in the direction indicated by the arrow will cause the valve cage to distort so that the ball valve may pass through the inlet 32 into the flow port 30.

In this regard, the diameter of the ball valve is preferably no greater than 3.5 times the diameter of the inlet 32 to permit the valve cage to deform without tearing the material of which the cage is formed.

It will be particularly noted from the FIGS. 6 and 8 of the drawings that the surfaces of the web members 34 facing the flow port 30 are substantially flat. Additionally, the web members taper in depth inwardly of the valve cage to a smallest dimension adjacent their intersection with each other substantially centrally of the valve cage to define an included angle between their inner surfaces of approximately 90°. By this construction the ball is prevented from becoming wedged in the cage under the forces acting thereon and only contact between the ball valve and the surfaces of the web members is obtained.

By the same token, the tapered construction of the web members maintains the ball valve substantially centered within the valve cage, thereby facilitating the rapid seating of the ball valve during the high speed operating conditions described above. In this regard it will also be noted that the intersection of the inlet 32 and the flow port 30 define an annular shoulder 46 which, as shown, is oriented at approximately 30° to the longitudinal axis of the valve assembly.

From the above it will be apparent that the present invention provides a valve assembly which is readily manufactured and yet is rugged enough to function under extreme operating conditions.

While the form of apparatus herein described constitutes a preferred embodiment of the invention, it is to be understood that the invention is not limited to this precise form of apparatus, and that changes may be made therein without departing from the scope of the invention.

What is claimed is:

1. In a valve assembly including an elastic, one-piece valve cage, means defining a flow port therethrough, a relatively rigid ball received in said valve cage and means defining an inlet to said flow port adjacent one end thereof of smaller diameter than the diameter of said ball, the improvement comprising:
   a. said flow port having a length less than the diameter of said ball,
   b. said flow port having a diameter only slightly greater than the diameter of said ball to permit only limited movement of said ball laterally of said flow port,
   c. a plurality of ribs formed integrally with said valve cage and radially disposed with respect to said valve cage adjacent an end of said flow port opposite said inlet,
   d. each of said ribs tapering in depth longitudinally of said valve cage and away from said flow port and being joined to each other at their smallest dimension adjacent the center of said valve cage,
   e. said ribs defining with portions of said valve cage with which they are integrally formed a plurality of outlet passages of substantially smaller area than the diameter of said ball to prevent accidental displacement of said ball from said valve cage through said outlet passages when said valve cage is subjected to severe acceleration forces,
   f. said ribs having inwardly facing surfaces sloping inwardly of said valve cage and away from said flow port, portions of which surfaces are positioned about the periphery of said ball when said ball is seated in said inlet and other portions of which engage said ball when said ball is displaced from said inlet, and
   g. said tapered construction of said ribs, said sloping surfaces thereof and said length of said flow port permitting limited movement of said ball from said seat while maintaining said ball substantially centered with respect to said flow port and in closely spaced relationship to said seat for rapid seating thereon.

2. The assembly of claim 1 wherein:
   a. said sloping surfaces of said ribs are substantially flat.

3. The assembly of claim 2 wherein:
   a. the included angle defined by said sloping surfaces of said ribs is approximately 90°.

4. The assembly of claim 1 wherein:
   a. said valve cage has a durometer Shore A value within the range of 50–90.

5. The assembly of claim 1 wherein:
   a. the diameter of said ball is no greater than 3.5 times than the diameter of said inlet.

6. The assembly of claim 1 further comprising:
   a. a pair of spaced legs extending from said valve cage adjacent said inlet and defining therebtween a groove extending across said inlet.

7. The assembly of claim 6 further comprising:
   a. means defining relieved portions on opposed inner surfaces of said spaced legs substantially concentric with said flow port to assist in installing said ball within said cage.

8. The assembly of claim 1 further comprising:
   a. an annular shoulder sloping inwardly of said valve cage at said inlet and away from said flow port.

9. The assembly of claim 8 wherein:
   a. said annular shoulder slopes at an angle of approximately 30° to the longitudinal axis of said valve cage.

10. In a valve assembly including an elastic, one-piece valve cage, means defining a flow port through said valve cage, a relatively rigid ball received in said valve cage and an inlet adjacent one end thereof having a diameter less than the diameter of said ball, the improvement comprising:
    a. said valve cage having a durometer Shore A value within the range of 50–90,
    b. said ball having a diameter no greater than 3.5 times the diameter of said inlet,
    c. the intersection of said inlet and said flow port defining a sloped annular shoulder extending inwardly of said valve cage away from said flow port and providing a sloped valve seat extending at approximately 30° to the axis of said valve cage,
    d. said flow port having a length substantially less than one-half the diameter of said ball and a diameter slightly greater than the diameter of said ball,
    e. a plurality of ribs formed integrally with said valve cage and radially disposed with respect to said flow port adjacent an end thereof opposite said inlet,
    f. each of said ribs tapering in depth longitudinally of said valve cage and away from said flow port adjacent the center of said valve cage to provide a plurality of outlet passages of substantially smaller area than the diameter of said ball to prevent accidental displacement of said ball from said valve cage through said outlet passages when said valve cage is subjected to severe acceleration forces,
    g. said tapered construction of said ribs providing flat, sloping surfaces sloping inwardly of said valve cage and away from said flow port at an included angle of approximately 90° and permitting limited movement of said ball from said seat while maintaining said ball substantially centered with respect to said flow port and in closely spaced relationship to said seat for rapid seating thereon, h. a pair of legs extending from one end of said valve cage adjacent said inlet and defining therebetween a groove substantially centrally positioned with respect to said valve cage, i. means defining substantially circular, relieved portions on inner, facing surfaces of said spaced legs substantially concentric with said flow port to align said ball with said inlet prior to assembly thereof, and j. the elasticity of said valve cage and the diameter of said ball and said inlet being such that said ball can be forced through said inlet into said flow port by nondestructive deformation of said valve cage adjacent said inlet.

* * * * *